(12) United States Patent
Aldred

(10) Patent No.: US 6,236,988 B1
(45) Date of Patent: May 22, 2001

(54) DATA RETRIEVAL SYSTEM

(75) Inventor: Barry Keith Aldred, Winchester (GB)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/146,789

(22) Filed: Sep. 3, 1998

(30) Foreign Application Priority Data

Sep. 5, 1997 (GB) .................................................. 9718773

(51) Int. Cl.⁷ ...................................................... G06F 17/30
(52) U.S. Cl. .............................. 707/3; 707/102; 707/104
(58) Field of Search ................................. 707/1, 3, 2, 4, 707/5, 6, 7, 100, 102, 103, 104

(56) References Cited

U.S. PATENT DOCUMENTS

| | | | | |
|---|---|---|---|---|
| 5,291,583 | * | 3/1994 | Bapat .................................... | 395/500 |
| 5,295,256 | * | 3/1994 | Bapat .................................... | 395/500 |
| 5,303,367 | | 4/1994 | Leenstra, Sr. et al. ............... | 395/600 |
| 5,555,409 | | 9/1996 | Leenstra, Sr. et al. ............... | 395/600 |
| 5,875,446 | * | 2/1999 | Brown et al. ............................. | 707/3 |
| 5,893,109 | * | 4/1999 | DeRose et al. ....................... | 707/104 |
| 6,016,499 | * | 1/2000 | Ferguson ............................. | 707/104 |
| 6,052,681 | * | 4/2000 | Harvey ..................................... | 707/3 |

* cited by examiner

*Primary Examiner*—Thomas Black
*Assistant Examiner*—Mary D. Wang
(74) *Attorney, Agent, or Firm*—Gail H. Zarick; Anne Vachon Dougherty

(57) ABSTRACT

A data retrieval system in which a plurality of objects having a multi-level hierarchical relationship are stored is disclosed. Thus, each object has a respective parent and a set of children. The system includes an index table comprising a respective name and associated identifier for each object, and a data table comprising a respective set of attributes and a position key associated with each object in the system. Each position key comprises a series of components, each component corresponding to a level of the hierarchy. A first component of said key stores the identifier of an associated object, and each successive component stores the identifier of the parent of the object stored in the previous component.

12 Claims, 5 Drawing Sheets

INDEX TABLE

| NAME | IDENTIFIER | pk1 | pk2 | pk3 |
|---|---|---|---|---|
| A | 1 | 1 | | |
| B | 2 | 2 | | |
| M | 3 | 1 | 3 | |
| N | 4 | 1 | 4 | |
| O | 5 | 1 | 5 | |
| X | 6 | 1 | 3 | 6 |
| Y | 7 | 1 | 3 | 7 |

DATA TABLE

| IDENTIFIER | PARENT | pk1 | pk2 | pk3 | ATTRIBUTES |
|---|---|---|---|---|---|
| 1 | | 1 | | | |
| 2 | | 2 | | | |
| 3 | 1 | 1 | 3 | | |
| 4 | 1 | 1 | 4 | | |
| 5 | 1 | 1 | 5 | | |
| 6 | 3 | 1 | 3 | 6 | |
| 7 | 3 | 1 | 3 | 7 | |

OBJECT CLASS DEFINITIONS

| CLASS | ATTRIBUTES |
|---|---|
| TOP | M:OBJECT CLASS |
| ORGANIZATION | M:ORGNAME,CEO<br>O:SHARE PRICE |
| SITE | M:SITE NAME |
| PRODUCT | M:PROD NAME,PRICE |
| EMPLOYEE | M:EMPL NAME,ID<br>O:INIT |
| SCHEMA | M:SCHEMA |

| PARENT | CHILD |
|---|---|
|  | TOP |
| TOP | ORGANIZATION |
| TOP | SITE |
| TOP | PRODUCT |
| TOP | EMPLOYEE |
| TOP | SCHEMA |

STRUCTURAL RULES

| PARENT | ALLOWED CLASS OF CHILDREN | NAMING ATTRIBUTES |
|---|---|---|
| ROOT | SCHEMA | OBJECT CLASS |
| ROOT | ORGANIZATION | ORG NAME |
| ORGANIZATION | SITE | SITE NAME |
| ORGANIZATION | PRODUCT | PROD NAME |
| SITE | EMPLOYEE | EMPL NAME |
| SITE | EMPLOYEE | ID |
| SITE | EMPLOYEE | INIT+ID |

FIG.2

INDEX TABLE

| NAME | IDENTIFIER |
|------|------------|
| A | 1 |
| B | 2 |
| M | 3 |
| N | 4 |
| O | 5 |
| X | 6 |
| Y | 7 |

DATA TABLE

| IDENTIFIER | PARENT | ATTRIBUTES |
|------------|--------|------------|
| 1 | | |
| 2 | | |
| 3 | 1 | |
| 4 | 1 | |
| 5 | 1 | |
| 6 | 3 | |
| 7 | 3 | |

INDEX TABLE

| NAME | IDENTIFIER | pk1 | pk2 | pk3 |
|------|------------|-----|-----|-----|
| A | 1 | 1 | | |
| B | 2 | 2 | | |
| M | 3 | 1 | 3 | |
| N | 4 | 1 | 4 | |
| O | 5 | 1 | 5 | |
| X | 6 | 1 | 3 | 6 |
| Y | 7 | 1 | 3 | 7 |

FIG.5A

DATA TABLE

| IDENTIFIER | PARENT | pk1 | pk2 | pk3 | ATTRIBUTES |
|------------|--------|-----|-----|-----|------------|
| 1 | | 1 | | | |
| 2 | | 2 | | | |
| 3 | 1 | 1 | 3 | | |
| 4 | 1 | 1 | 4 | | |
| 5 | 1 | 1 | 5 | | |
| 6 | 3 | 1 | 3 | 6 | |
| 7 | 3 | 1 | 3 | 7 | |

FIG.5B

INDEX TABLE

| NAME | IDENTIFIER | LEVEL |
|---|---|---|
| A | 1 | 1 |
| B | 2 | 1 |
| M | 3 | 2 |
| N | 4 | 2 |
| O | 5 | 2 |
| X | 6 | 3 |
| Y | 7 | 3 |

FIG.6A

DATA TABLE

| pk1 | pk2 | pk3 | ATTRIBUTES |
|---|---|---|---|
| 1 | | | |
| 2 | | | |
| 1 | 3 | | |
| 1 | 4 | | |
| 1 | 5 | | |
| 1 | 3 | 6 | |
| 1 | 3 | 7 | |

FIG.6B

DATA RETRIEVAL SYSTEM

FIELD OF THE INVENTION

The invention relates to a data retrieval system, in particular a system for retrieving hierarchically related objects from a relational database.

BACKGROUND OF THE INVENTION

This invention is described in relation to an LDAP (Lightweight Directory Access Protocol) directory server using a relational database as a backing store. This is a particularly appropriate example of hierarchical information which is nonetheless stored in a relational database. It will be seen from the following description, however, that the invention is not restricted to LDAP and is of use wherever hierarchically related objects (data) have to be stored and retrieved from a relational database.

An LDAP directory of the known type comprises a collection of hierarchically related objects, an example of which is shown in FIG. 1. The structure of the directory and content of its objects are typically determined by the contents of a schema object which s normally itself stored in the directory. The contents of this schema object comprise a set of object class definitions and a set of structural rules, as shown for the above example in FIG. 2. The class definitions include a) a list of both mandatory (M) and optional (O) attributes for each object class allowed in the directory; and b) a list defining the hierarchical relationships between object classes and hence the inheritance rules for class definitions. In the above example, all object classes other than top are subclasses of the class top, thus inheriting the attribute objectClass.

The structural rules control the arrangement of objects in the directory hierarchy and comprise a list of the allowed child object classes to each parent class and, for each such combination, the naming attributers) to be used to provide a unique relative distinguished name (RDN) for such an object.

The relative distinguished name (RDN) provides a unique name for an object at that point in the directory hierarchy. Its format is thus somewhat unpredictable for any object, as it is formed by a combination of one or more of the object's attributes and as can be seen from the naming attributes for employees, many different attributes may be used for an object at any one point in the tree. LDAP objects also have a unique name in the directory—the distinguished name (DN). The DN is formed by the successive, sequential concatenation of the RDNs of the object itself and its parents, back up to the root of the directory tree.

Thus, even in the simple case of FIG. 1, the RDN for John Doe may be init=JDD+ID=005047, and the DN may be orgName=IBM, siteName=Arizona, init=JDD+ID=005047; while the RDN for Jane Deer may in fact be emplNate=Jane Deer and the DN may be orgName=IBM, siteName=Arizona, emplName=Jane Deer.

The nature of the LDAP data model means that hierarchies may be varied and complex; similarly the naming scheme for objects as exemplified above also permits substantial variability. As a result, the schema definition itself for a directory does not provide a mechanism that can be easily adapted for storage and access of the directory contents. Consequently a data retrieval system is needed whereby objects can be assigned to a store with indexing to permit subsequent efficient search and retrieval.

DISCLOSURE OF THE INVENTION

Accordingly, the present invention provides a data retrieval system in which a plurality of objects having a multi-level hierarchical relationship are stored, each object having a respective parent and a set of children, said system including an index table comprising a respective name and associated identifier for each object, and a data table comprising a respective set of attributes and a position key associated with each object in the system, each position key comprising a series of components, each component corresponding to a level of the hierarchy, a first component of said key storing the identifier of an associated object, and each successive component storing the identifier of the parent of the object stored in the previous component.

BRIEF DESCRIPTION OF THE DRAWINGS

FIG. 2 is a conventional schema for the LDAP directory of FIG. 1;

FIGS. 5(a) & 5(b) are index and data tables for use in a data retrieval system according to a first embodiment of the invention; and FIGS. 6(a) & 6(b) are index and data tables for use in a data retrieval system according to a second embodiment of the invention.

DESCRIPTION OF THE PREFERRED EMBODIMENTS

The most frequently used search and retrieval operations in the LDAP protocol, and for most hierarchical databases, are:

1. Retrieval of the object from the specification of its DN. Using the data of FIG. 1, for example, retrieve the object orgName=Microsoft, prodName=Windows3.1.
2. Search of the directory tree, from a parent object specified by DN, where a value for an attribute is specified, so as to retrieve a subset of its immediate children. For example, again using FIG. 1, search from orgName=IBM, siteName=Arizona for emplName=John.
3. As above, but to retrieve an object and any descendant of the object rather than be restricted to immediate children. For example, retrieve orgName=IBM and all its descendent objects. This may be combined with further search criteria, for example, emplName=John Doe.

The precise details of the mapping of directory objects into tables is not part of this disclosure. Although in practice the objects will be mapped into several tables, it is simpler here to assume that all the objects are assigned to a single table. It is necessary, however, that each object is assigned a unique identifier. Although it is permissible to use the DN for this purpose, the DN is generally long and of varying length and therefore somewhat unsuitable. Thus, in the present embodiments, a unique numeric identifier is assigned to each object.

Figure 1:
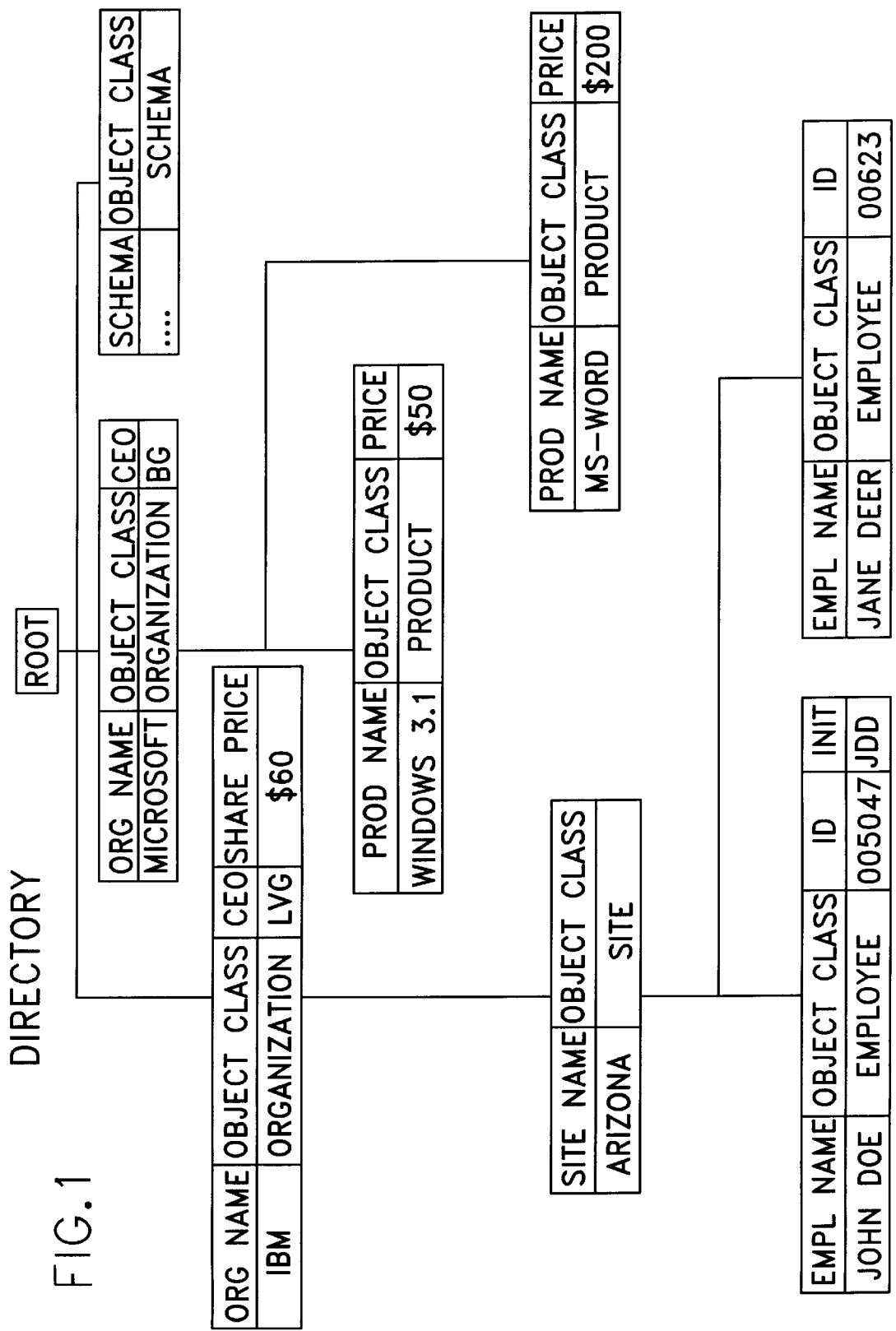
FIG. 1 is a diagram illustrating a conventional LDAP directory.
Figures 3, 4A, 4B:
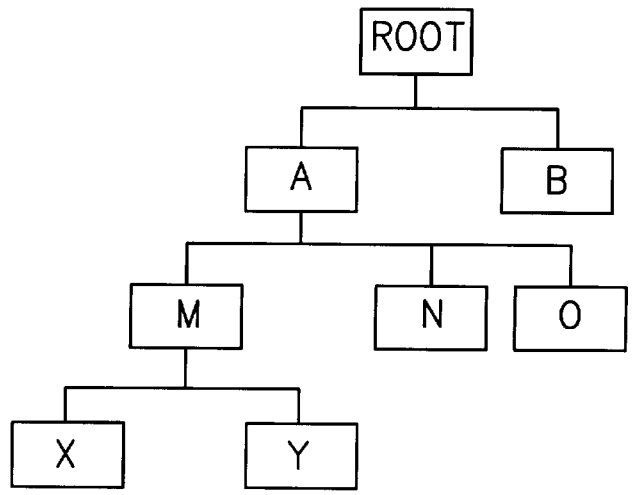
FIG. 3 illustrates some hierarchical data.
FIGS. 4(a) & 4(b) are conventional index and data tables for the hierarchical data of FIG. 3.

Taking the data of FIG. 3 for example, a conventional storage scheme which might normally be adopted is shown in FIGS. 4(a) and 4(b). Two tables are involved; an index table, FIG. 4(a) which maps between each object DN (A,B,M . . . Y) and unique identifier (1 . . . 7), and a data table which holds a row for each object. The data table also holds the unique identifier of the object's parent. The data table has columns for the various object attributes, including one for the unique object identifier. In summary:

Index table (row for each object):
    Object name (DN)
    Object identifier
Data table (row for each object)
    Object attributes (one column for each)
    Object identifier
    Parent object identifier Variations on this general theme may be used e.g. the parent identifier may be stored in the index table rather than in the data table. However all similar schemes have the characteristics that they support direct retrieval of an object whose name is known, but do not provide for efficient search and/or retrieval for descendants explained in point 3 above. For example, if the objects for the database of FIG. 1 are not stored in order in tables of the type shown in FIG. 4, then a search for the descendants of IBM, could only retrieve descendants of the Arizona object stored sequentially after the location of the Arizona object. The search engine would then need to traverse the table again to find all children of the Arizona object stored before the Arizona object in the table, and so on for these children.

A retrieval system operating on such an index and data table must effectively navigate the hierarchy, thereby resulting in many sequential operations and traverses of the data table. If the tables are implemented in a relational database this prohibits the use of the relational operators to conduct a full descendants search in a single traverse of the table.

The data retrieval system according to the invention overcomes these limitations.

For each object, its position in the hierarchy can be described by the sequential concatenation of its own unique in the directory identifier with those of their parents, taken in sequence. This collection of values will be termed the position key. Note that in the LDAP case, the position key would generally not be the same as the DN, which is formed by the concatenation of unique at that branch of the tree identifiers.

In a first embodiment of the invention, FIGS. 5(a) and 5(b), the position key (pk1, pk2, pk3) for an object is preferably stored as a set of values in a suitable number of columns assigned in the both the index and data tables (one column being required for each level in the directory tree hierarchy). The advantage of the position key is that the object data is now very easily searched on a hierarchical basis; thus if any descendants of a particular object are required, the position key of the parent can be used in a search condition on an object table (see the example below). Moreover the key can also be used to control the level of searching. If only the immediate descendants are required then the search above can be further restricted by requiring that all other columns assigned to the position, save that for the level of the immediate descendant, be null. Variations on this allow control of the depth of the search. Using the tables of FIGS. 5(a) and 5(b):

1. A is found by a select on the data table where: identifier=1.
2. The immediate children of A are found by a select on the data table where: pk1=1 & pk2=null & pk3=null.
3. All descendants of A are found by a select on the data table where: pk1=1 & pk2!=null.
4. The children of M are found by a select on the data table where: pk1=1 & pk2=3 & pk3!=null where != designates the boolean operator "not equal".

A second embodiment, FIGS. 6(a) & 6(b), overcomes the problem of the first embodiment taking significant storage in the index table. It will be seen that is not necessary to use all the columns of the position key to achieve the desired effect. Only the lowest column (i.e. that non-null column furthest from the root) is significant in identifying an object; the higher level columns contain redundant data. Moreover the value in this column is the unique object identifier itself. Accordingly, in the index table, FIG. 6(a), instead of adding the position key to the contents previously described it is sufficient to add a single column, entitled Level, containing the level of that object in the hierarchy (this indicates the position key column relevant to the unique identifier).

In the data table, FIG. 6(b), given the information content of the position key, the two columns previously described that respectively contain the unique object and parent identifiers are no longer needed. The tables are now:

Index table (row for each object):
    Object name
    Object identifier
    Object level in directory tree
Data table (row for each object)
    Object attributes (one column for each)
    Position key identifier (one column for each level in the hierarchy)

Using the tables of FIGS. 6(a) & 6(b):

1. A is found by a select on the index table where: identifier=1.
2. The immediate children of A are found by a select on the data table where: pk1=1 & pk2=!null & pk3=null.
3. All descendants of A are found by a select on the data table where: pk1=1 & pk2=!null.
4. The children of M are found by a select on the data table where: pk2=3 & pk3=!null.

Thus, in comparison with the conventional tables of FIG. 4, the index table of the second embodiment contains one extra column, while the data table of the second embodiment contains extra columns for two less than the number of levels in the hierarchy. However search operations are now reduced to a simple traverse of a the data table, instead of the complex sequence of selects previously required.

What is claimed is:

1. A data retrieval system in which a plurality of objects related to each other in a multi-level hierarchy are stored, each object having a respective parent and a plurality of children, comprising:
    an index table comprising a name and associated identifier for each object; and
    a data table comprising a set of attributes and a position key for each object in the system, each position key comprising a plurality of components, each component corresponding to a level of said hierarchy, said position key comprising a first component comprising the identifier of an associated object and at least one successive component, each successive component storing the identifier of the parent of the object stored in the preceding component.

2. The data retrieval system of claim 1 wherein said index table further comprises an attribute storing the level of each object in the system.

3. The data retrieval system of claim 1 wherein said index table comprises a position key associated with each object in the system, and said data table includes an identifier associated with each object and a respective identifier of the parent of each object in the system.

4. A method for retrieving an object name for an object stored in a data retrieval system in which a plurality of objects related to each other in a multi-level hierarchy are stored, each object having a respective parent and a plurality of children, said system comprising an index table comprising a name and associated identifier for each object; and a data table comprising a set of attributes and a position key for each object in the system, each position key comprising a plurality of components, each component corresponding to a level of said hierarchy, said position key comprising a first component comprising the identifier of an associated object and at least one successive component, each successive component storing the identifier of the parent of the object stored in the preceding component, said method comprising the steps of:

specifying an object identifier for the object; and retrieving from said index table the name for the object whose stored identifier matches said specified object identifier.

5. A method for retrieving the descendants of an object stored in a data retrieval system in which a plurality of objects related to each other in a multi-level hierarchy are stored, each object having a respective parent and a plurality of children, said system comprising an index table comprising a name and associated identifier for each object; and a data table comprising a set of attributes and a position key for each object in the system, each position key comprising a plurality of components, each component corresponding to a level of said hierarchy, said position key comprising a first component comprising the identifier of an associated object and at least one successive component, each successive component storing the identifier of the parent of the object stored in the preceding component and wherein said index table further comprises an attribute storing the level of each object in the system, comprising the steps of:

specifying an object identifier for the object;

searching the index table to ascertain the hierarchical level of said object;

selecting from the data table objects for which the position key component for said level matches the object identifier;

identifying objects wherein the position key component for the first hierarchical level below said level are not null; and retrieving the object identifiers for said identified objects.

6. The method of claim 5 wherein only the immediate children of said object are to be retrieved, wherein said identifying further comprises locating those objects for which the position key component for the first hierarchical level below said level are not null and the position key component for the next hierarchical level below said first hierarchical level are null; and wherein said retrieving comprises retrieving the respective object identifiers for those located objects.

7. The method of claim 5 wherein said selecting, said identifying and said retrieving are carried out in a single traverse of said data table.

8. The method of claim 5 wherein the retrieved object identifiers are stored in each of the first components of the respective position keys.

9. A method for retrieving an object name for an object stored in a data retrieval system in which a plurality of objects related to each other in a multi-level hierarchy are stored, each object having a respective parent and a plurality of children, said system comprising an index table comprising a name and associated identifier for each object and a data table comprising a set of attributes and a position key for each object in the system, each position key comprising a plurality of components, each component corresponding to a level of said hierarchy, said position key comprising a first component comprising the identifier of an associated object and at least one successive component, each successive component storing the identifier of the parent of the object stored in the preceding component, and wherein said index table comprises a position key associated with each object in the system, and said data table includes an identifier associated with each object and a respective identifier of the parent of each object in the system, said method comprising the steps of:

specifying an object identifier for the object; and retrieving from said index table the name for the object whose stored identifier matches said specified object identifier.

10. A method for retrieving the immediate children of an object stored in a data retrieval system in which a plurality of objects related to each other in a multi-level hierarchy are stored, each object having a respective parent and a plurality of children, said system comprising an index table comprising a name and associated identifier for each object and a data table comprising a set of attributes and a position key for each object in the system, each position key comprising a plurality of components, each component corresponding to a level of said hierarchy, said position key comprising a first component comprising the identifier of an associated object and at least one successive component, each successive component storing the identifier of the parent of the object stored in the preceding component, and wherein said index table comprises a position key associated with each object in the system, and said data table includes an identifier associated with each object and a respective identifier of the parent of each object in the system, said method comprising the steps of:

specifying an object identifier for the object; and for objects where the contents of the parent identifier match the identifier of the object, retrieving the respective object identifiers.

11. A method for retrieving the descendants of an object stored in a data retrieval system in which a plurality of objects related to each other in a multi-level hierarchy are stored, each object having a respective parent and a plurality of children, said system comprising an index table comprising a name and associated identifier for each object; and a data table comprising a set of attributes and a position key for each object in the system, each position key comprising a plurality of components, each component corresponding to a level of said hierarchy, said position key comprising a first component comprising the identifier of an associated object and at least one successive component, each successive component storing the identifier of the parent of the object stored in the preceding component and wherein said index table further comprises an attribute storing the level of each object in the system, comprising the steps of:

specifying an object identifier for the object;

ascertaining the hierarchical level of said object by determining if the first component of said position key matches said object identifier;

selecting from the data table objects for which the position key component for said level matches the object identifier;

identifying objects wherein the position key component for the first hierarchical level below said level are not null; and retrieving the object identifiers for said identified objects.

12. A computer program product comprising computer readable program code stored on a computer readable recording medium, the program code including a relational database package including program code adapted to execute the method for retrieving the descendants of an object stored in a data retrieval system in which a plurality of objects related to each other in a multi-level hierarchy are stored, each object having a respective parent and a plurality of children, said system comprising an index table comprising a name and associated identifier for each object; and a data table comprising a set of attributes and a position key for each object in the system, each position key comprising a plurality of components, each component corresponding to a level of said hierarchy, said position key comprising a first component comprising the identifier of an associated object and at least one successive component, each successive component storing the identifier of the parent of the object stored in the preceding component and wherein said index table further comprises an attribute storing the level of each object in the system, comprising the steps of: specifying an object identifier for the object; searching the index table to ascertain the hierarchical level of said object; selecting from the data table objects for which the position key component for said level matches the object identifier; identifying objects wherein the position key component for the first hierarchical level below said level are not null; and retrieving the object identifiers for said identified objects.

\* \* \* \* \*